May 27, 1952  A. GRUENAIS  2,598,160
LARGE CAPACITY TANK HAVING CORRUGATED ENDS
Filed Sept. 18, 1945  3 Sheets-Sheet 3

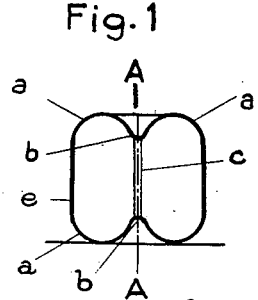
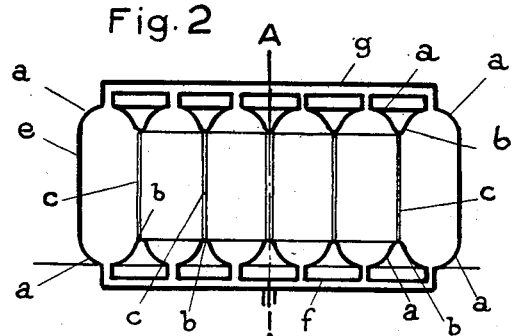
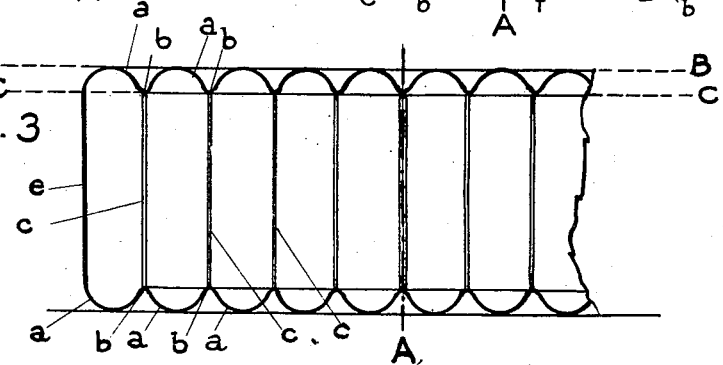
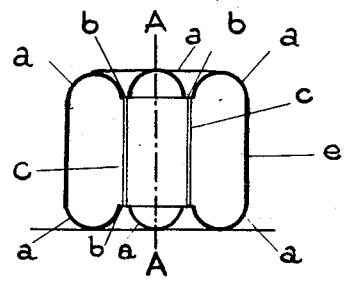
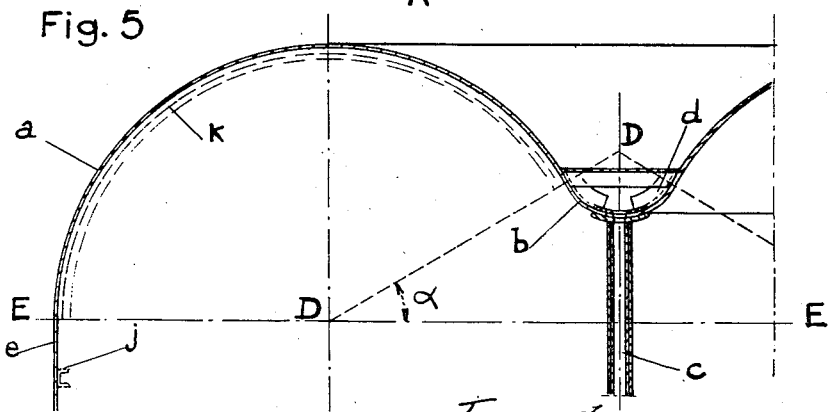

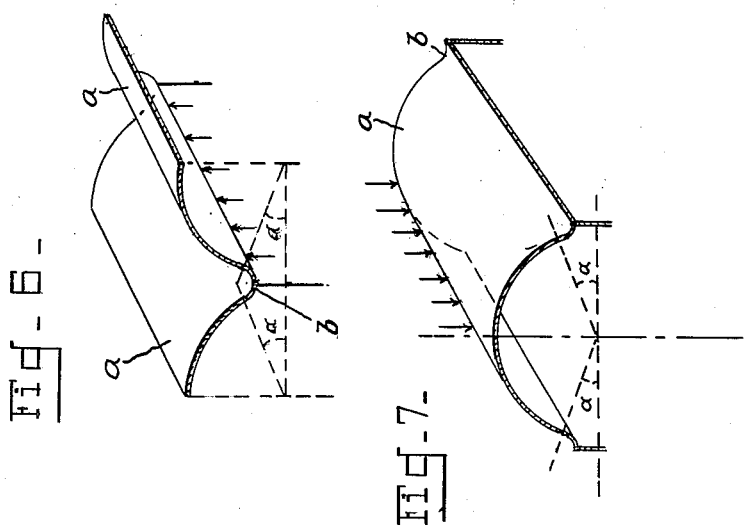
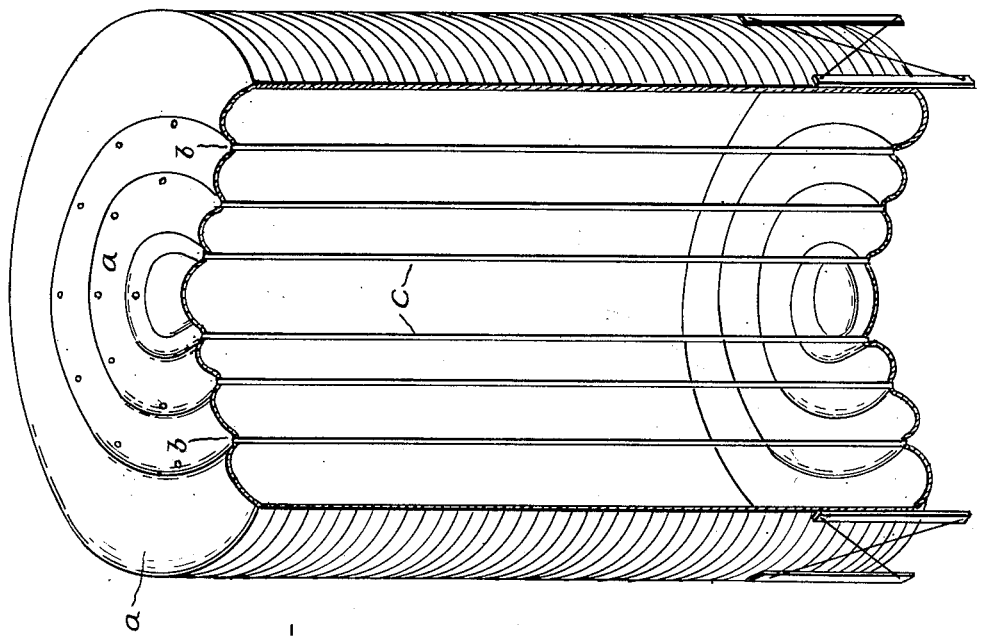
INVENTOR
Adolphe Gruenais,

Inventor
Adolphe Gruenais
by [signature] Atty.

Patented May 27, 1952

2,598,160

UNITED STATES PATENT OFFICE 2,598,160

LARGE CAPACITY TANK HAVING CORRUGATED ENDS

Adolphe Gruenais, Paris, France

Application September 18, 1945, Serial No. 617,079
In France November 4, 1943

Section 1, Public Law 690, August 8, 1946
Patent expires November 4, 1963

6 Claims. (Cl. 220—1)

This invention relates to a tank having a large capacity and a corrugated cap.

Certain volatile or gaseous products as well as certain distributors of liquids under pressure require for the stocking or the distribution of the same tanks having a verticle axis and large capacities and, therefore, large diameters, which must withstand a strong inner pressure caused by the vapour pressure of the liquids, the pressure of the gases or the pressure of distribution.

Said pressure can reach thousands of kilograms per square metre of area.

Since the vapour pressure rises with the temperature, it becomes higher when the tanks are submitted to the direct action of solar rays. On the contrary, a falling temperature or any other reason can entail a reduction of the vapour pressure and render certain products viscous.

The inner pressure renders difficult, for large diameters, the construction of ordinary tanks having a vertical axis. It requires, for the strength of the cap or of the bottom as well as for the fastenings with the cylindrical part, important frameworks or strengthening girders.

The present invention has for its chief object to obviate these disadvantages by increasing the strength of the bottom and of the cap as well with respect to the inner pressure of the tank as with respect to a lowering of the pressure.

The invention also permits the insulation of the cap against the action of solar rays and the preheating of the bottom of the tank, thus facilitating the outflow of the viscous products.

Tanks making it possible to attain the above mentioned objects show the characteristic features which will appear from the following description and more particularly from the appended claims.

The following is a description of tanks made of steel sheet and riveted or welded, but said tanks can be made on the same principles of any other construction material employed alone or combined, such as: aluminum, copper, concrete and steel and the like.

Figure 1 is a vertical sectional view showing a tank of small size the body of which is of a cylindrical form.

Figure 2 is a vertical sectional view showing a tank of middle size having a cylindrical body.

Figure 3 is a partial vertical sectional view showing a tank of large size having a cylindrical body.

Figure 4 is a vertical sectional view showing a tank the surfaces of the cap and of the bottom of which are convex in the middle instead of being concave as in Figures 1, 2 and 3.

Figure 5 is a detail sectional view showing the undulation of the cap directly in connection with the cylindrical body of the tank.

Figure 6 is a perspective view showing a corrugation element of the cap forming a beam under the action of the inner pressure in the tank between two ties connecting the bottom with the cap.

Figure 7 is a perspective view showing a corrugation element of the cap withstanding the partial vacuum inside the tank.

Figure 15 is a perspective view of a tank embodying the invention which is partially in section to disclose, for the sake of clarity, only a few of the vertical stays within the tank.

Figure 8:
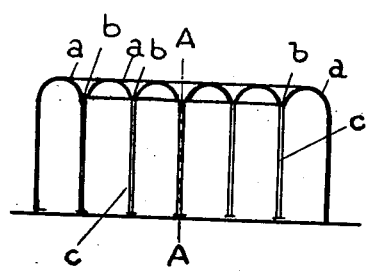
Figures 8, 9, 10 and 11 represent an elevational sectional view of other embodiments of the tank.

The described tank according to the invention is a cylindrical tank of revolution having a vertical axis AA intended normally to withstand an inner pressure and, occasionally, a partial vacuum (Figures 1, 2, 3 and so on). The particularity of its construction is the use, for the cap and for the bottom, of one and the same undulated form the surfaces of which are alternately convex starting from the outside and then concave and so on. The undulations can be of any number. It is determined so that the surface is concave or convex in the middle.

The use of an undulated shape for the cap and for the bottom renders possible tangential connections between the surfaces of the tank, thus facilitating the obtention of the strength and the construction.

The vertical sections thru the convex surfaces $a$ or the concave surfaces $b$ are circular sections which form fragments of tori in their revolution about the axis AA of the tank. The surface of the centre is reduced to a portion of a sphere.

The convex surfaces $a$ work normally on stretching in the case of an inner pressure; their sections are preferably chosen with a large radius of curvature. The corrugations form through their high moment of inertia strengthening beams maintained by some cross-pieces judiciously arranged between the bottom and the cap (Fig. 6 and 7). This results in an important reduction of the weight.

The concave surfaces $b$ are chosen especially for serving as a connection with the convex surfaces. Their sections have a small radius of curvature with respect to that of the sections of the convex surfaces.

The radii of curvature of said convex and concave surfaces are determined by the calculations and the practical conditions of the construction.

It is preferable that all the sections of the convex surfaces of the cap and of the bottom of one and the same tank have one and the same radius of curvature, but this is not an absolute obligation for the construction of the tank. The same is true for the sections of the convex surfaces.

The inner pressure in the tank normally tends to move the cap and the bottom away from each other. It is therefore indispensable for tanks of a certain diameter to connect the cap with the bottom by means of a certain number of vertical posts $c$ the purpose of which is to withstand said pressure. The number and the importance of said posts are given by the calculations. The posts are arranged in relative spaced rows concentric with the axis of the tank and the posts are arranged in the separate rows in relatively spaced relation to each other, as partially shown in Fig. 15. In the case of a partial vacuum inside, said posts work while withstanding the outer strains.

Said posts support the cap when the tank is not under pressure.

In order to leave to the convex parts the advantage of working on stretching, the posts are arranged in the axis of the concave parts and on the periphery of the latter. They are fastened on the concave parts of the cap and of the bottom, which requires the agreement between the undulations.

In certain cases said posts can serve for the draining of the water out of the cap.

This undulated shape insures a certain elasticity to the cap and to the bottom. It conduces to the maintenance of a good tightness during the expansions and contractions of the tank under the action of the variations of the temperature.

The convex surfaces can be stiffened on the outside of the tank if it is deemed necessary by means of angle bars or sections of any shape $d$ or even thru a concrete filling (Figure 5).

The concavity of certain surfaces makes it possible to provide an insulation zone of air, water or any other body between the planes BB and CC of the upper part of the tank (Figure 3). Said insulation opposes the rising of the temperature inside the tank when the latter is submitted to the outer action of solar rays.

The concavity of the bottom makes it possible to use an external preheating device capable of raising the temperature of the stored product and thus facilitating its outflow when it tends to become viscous by cooling.

The undulated shape chosen for the cap and for the bottom as well as the cylindrical shape of the tank facilitate, in advantageous conditions of execution, the gradual obtention of the capacities, either only by increasing the height of the cylindrical part $c$ or by increasing the radius of the tank by a complementary undulation. Figures 1, 2 and 3 explain this facility.

The cylindrical part of the tank is more or less important according to the required capacities. In certain cases it can be omitted without any inconvenience.

The emptying of the tank and the balance of the inner pressure are insured by intercommunication pipes $f$ and $g$ between parts of the same level. Figure 2 shows a possible arrangement.

The accessories of the tank such as manholes, gauging holes, filling devices and the like are arranged at the places which are deemed the most advantageous for the working.

This tank has been described under the supposition that the undulated shapes of the bottom and of the cap are identical.

Figure 9:
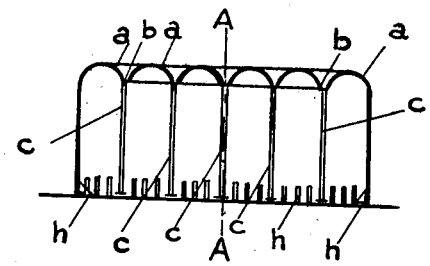
Figure 10:
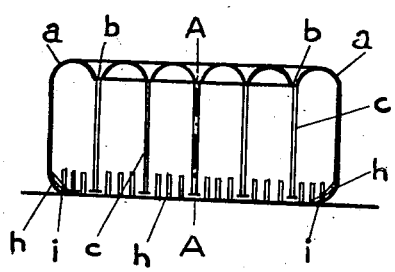
Figure 11:
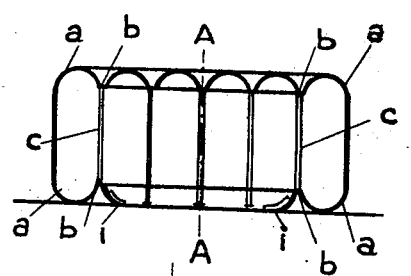

In certain cases it may be advantageous to simplify the construction of the bottom either while maintaining the usual construction adopted for ordinary tanks (Figure 8) or by limiting the strengthening of the bottom to inner gusset plates $h$ completed or not by stiffeners $i$ or to any other framework arrangement yielding the same result (Figure 9 and Figure 10), or still by using a bottom the undulated shape of which is limited to one or more undulations on the outer periphery of the tank as shown in Figure 11. For these tanks the vertical posts connecting the cap with the bottom remain placed in the axis of the concave parts of the cap and are distributed on the peripheries of these surfaces.

The partial condensation of the vapours contained in the tank or any other cause can produce an internal partial vacuum with respect to the outer atmospheric pressure. In this case, the tank must withstand an outer pressure which is more or less high. The metal sheets of the cylindrical body $c$ or of the convex surfaces $a$ work then on compression instead of working on stretching. If the thickness of said sheets are deemed insufficient for withstanding the stress of the outer pressure they are strengthened by means of rings $j$ or transversal stiffeners $k$ secured inside said surfaces, as shown in Figure 5. Said stiffening rings can be iron sections of any shape such as angle bars, U-irons and the like or any other framework device yielding the same result.

Figure 5 shows a sectional view of a dissymmetrical undulation the centre line DD of which is sloping and makes an angle $\alpha$ with the horizontal plane. Said angle $\alpha$ is determined by the practical advantages of the construction. For certain applications it can be naught; then the line DD lies in the horizontal plane EE.

For certain tanks such as those which are submitted to a very small pressure or to a partial vacuum it can be of interest, as regards the cost of the construction, to omit the concave surfaces of the cap and of the bottom, the connection of the convex surfaces with one another being insured by plane surfaces constituted either by a horizontal sheet folded up on its edges and strengthened or not by any stiffeners, or by an I or U-iron section or by any other arrangement yielding the same result.

Figure 12:
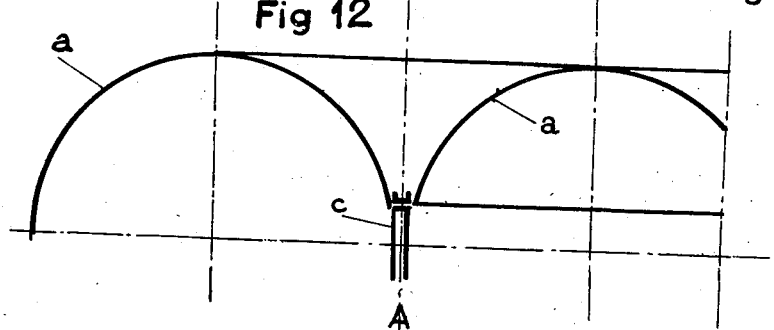
Figure 12 is a diagrammatical view of another embodiment of the undulations.

Figure 12 is a sectional view showing a possible construction.

Figure 13:
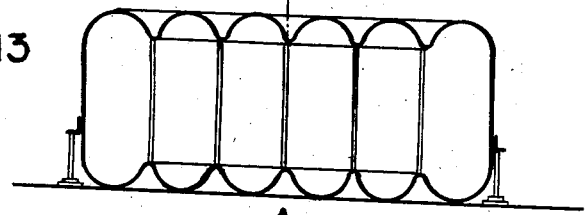
Figures 13 and 14 are diagrammatical views of two other embodiments of the tank.

When the cylindrical part of the tank represents an important weight it is possible to reduce the effect of this weight on the periphery of the outer undulation of the bottom by causing said weight to bear on the foundations by means of posts arranged on the periphery of said part or of any other suitable arrangement such as a distribution beam or bedplate. Figure 13 shows a construction with supporting posts.

Figure 14:
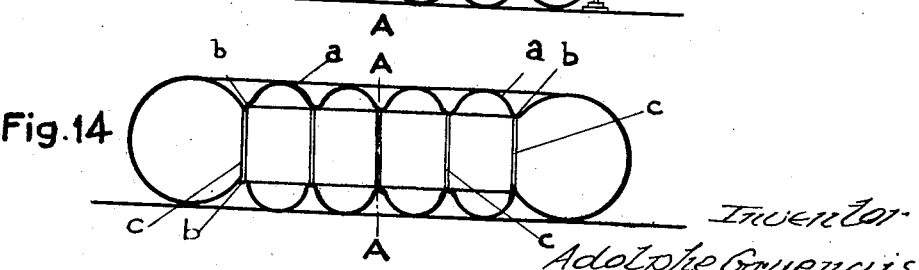

The application of the undulated shape to the cap and to the bottom of tanks having a vertical axis is possible not only for tanks with a cylindrical body but also for all the tanks in which the body connecting the bottom with the cap shows any form of revolution. For these tanks the surfaces of the outer body are connected tangentially with the convex or concave surfaces of the cap and of the bottom according to the facilities of the construction. Figure 14 is a sectional view showing a tank the outer body of which has a circular section and is connected with one of the concave surfaces of the cap and of the bottom.

I claim:

1. In a cylindrical large-capacity tank having a vertical axis, a corrugated end having alternating convex surfaces of revolution about the axis of the tank and alternating concave surfaces of revolution about the same axis between said convex surfaces and intersecting the same, a bottom, vertical stays disposed between the end and the bottom and distributed over the peripheries of the imaginary cylinders about the tank axis by the vertical axes of the concave surfaces.

2. In a large-capacity cylindrical tank having a vertical axis, a corrugated top end and bottom of similar kind and symmetrical with respect to the interior of the tank, having alternating convex surfaces of revolution generated about the axis of the tank and provided on the top end and the bottom and alternating concave surfaces of revolution generated about the same axis between said convex surfaces and intersecting the same in a horizontal plane, vertical stays disposed between the top end and the bottom and distributed over the peripheries of imaginary cylinders generated about the tank axis by the vertical axes of the corresponding concave surfaces.

3. In a large-capacity cylindrical tank having a vertical axis, a corrugated top end and bottom of similar kind and symmetrical with respect to the interior of the tank, having alternating convex surfaces of revolution generated about the axis of the tank and provided on the top end and the bottom and alternating concave surfaces of revolution generated about the same axis between said convex surfaces and intersecting the same, vertical stays disposed between the top end and the bottom and distributed over the peripheries of imaginary cylinders generated about the tank axis by the vertical axes of the corresponding concave surfaces.

4. In a large-capacity cylindrical tank having a vertical axis, a corrugated top end and bottom of similar kind and symmetrical with respect to the interior of the tank, having alternating convex surfaces of revolution about the axis of the tank and alternating concave surfaces of revolution about the same axis between said convex surfaces and intersecting the same vertical stays disposed between the top end and the bottom and distributed about the peripheries of imaginary cylinders generated about the axis by the vertical axes of the corresponding concave surfaces, downwardly extending pipes disposed in the vertical stays for insuring emptying of rain water that may collect in the concave portions of the top end.

5. In a large-capacity cylindrical tank having a vertical axis, a corrugated top and bottom of similar kind and symmetrical with respect to the interior of the tank, having alternating convex surfaces of revolution about the axis of the tank and alternating concave surfaces of revolution about the same axis between said convex surfaces and intersecting the same vertical stays disposed between the top end and the bottom and distributed over the peripheries of imaginary cylinders generated about the axis by the vertical axes of the corresponding concave surfaces and corner irons for reinforcing the convex surfaces of the corrugations.

6. In a large-capacity cylindrical tank having a vertical axis, a corrugated top and bottom of similar kind and symmetrical with respect to the interior of the tank, having alternating convex surfaces of revolution about the axis of the tank and alternating concave surfaces of revolution about the same axis between said convex surfaces and intersecting the same vertical stays disposed between the top end and the bottom and distributed over the peripheries of imaginary cylinders generated about the axis by the vertical axes of the corresponding concave surfaces, horizontal communication pipes connecting the convex corrugations of the bottom for permitting the free circulation of the liquid in the bottom of the tank.

ADOLPHE GRUENAIS.

REFERENCES CITED

The following references are of record in the file of this patent:

UNITED STATES PATENTS

| Number | Name | Date |
| --- | --- | --- |
| 2,094,589 | Day | Oct. 5, 1937 |
| 2,237,308 | Larson | Apr. 8, 1941 |
| 2,250,250 | Brooks | July 22, 1941 |
| 2,297,002 | Larson | Sept. 29, 1942 |
| 2,349,096 | Jackson | May 16, 1944 |
| 2,354,691 | Lebedeff | Aug. 1, 1944 |
| 2,380,089 | Ulm | July 10, 1945 |

FOREIGN PATENTS

| Number | Country | Date |
| --- | --- | --- |
| 411,972 | Great Britain | June 21, 1934 |
| 522,499 | Great Britain | June 19, 1940 |